Jan. 2, 1923.

H. E. C. JEFFERSON.
AUTOMATIC SKETCHING AND SURVEYING INSTRUMENT.
FILED JULY 27, 1920.

WITNESSES:

INVENTOR
H. E. C. Jefferson
BY
Victor J. Evans
ATTORNEY

Jan. 2, 1923.
H. E. C. JEFFERSON.
AUTOMATIC SKETCHING AND SURVEYING INSTRUMENT.
FILED JULY 27, 1920.
1,441,153.
5 SHEETS—SHEET 2.
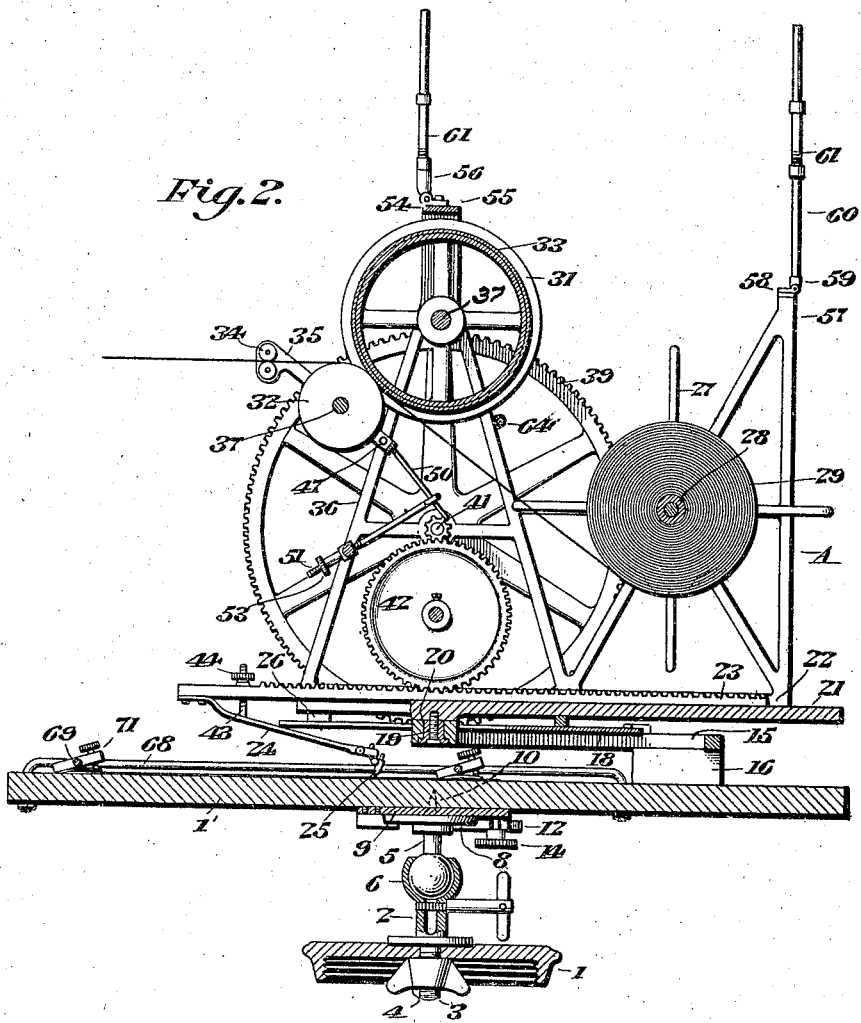
Fig.2.
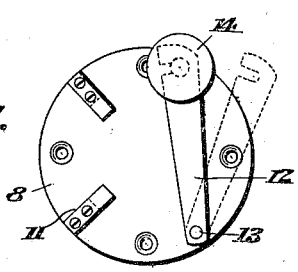
Fig.II.
Witnesses
Inventor
H. E. C. Jefferson
By Victor J. Evans
Attorney Jan. 2, 1923.

H. E. C. JEFFERSON.
AUTOMATIC SKETCHING AND SURVEYING INSTRUMENT.
FILED JULY 27, 1920.

Witnesses

Inventor
H. E. C. Jefferson
By Victor J. Evans
Attorney

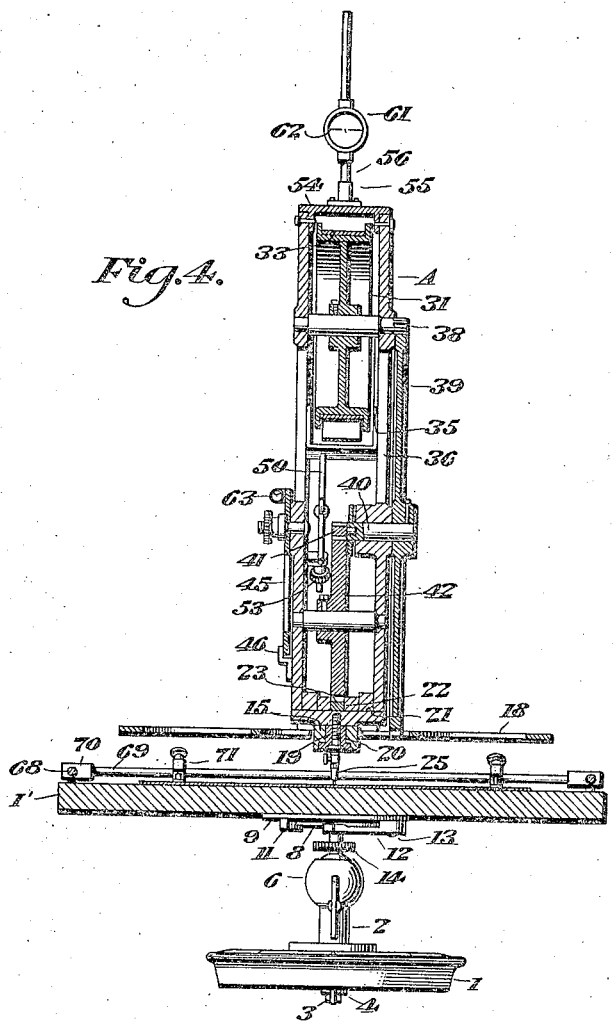

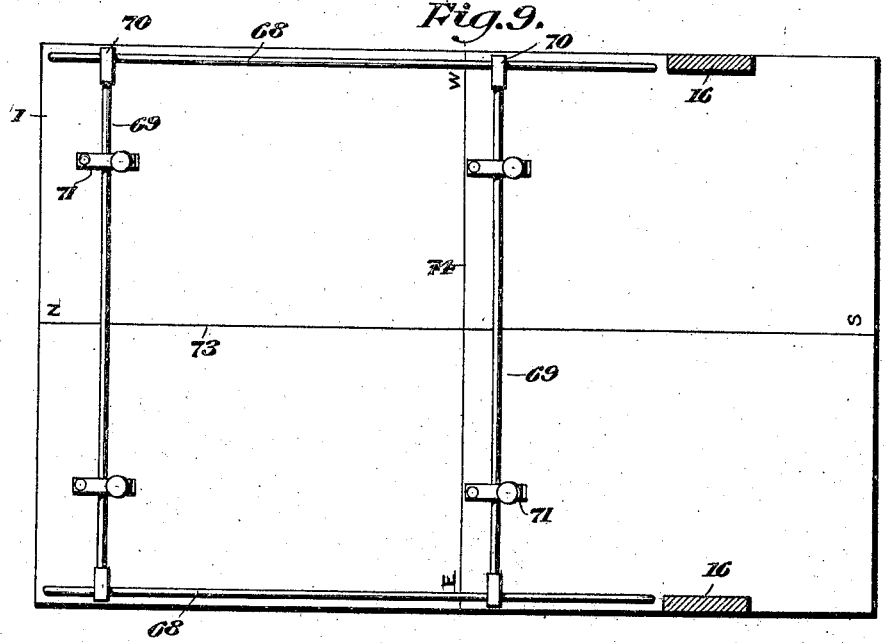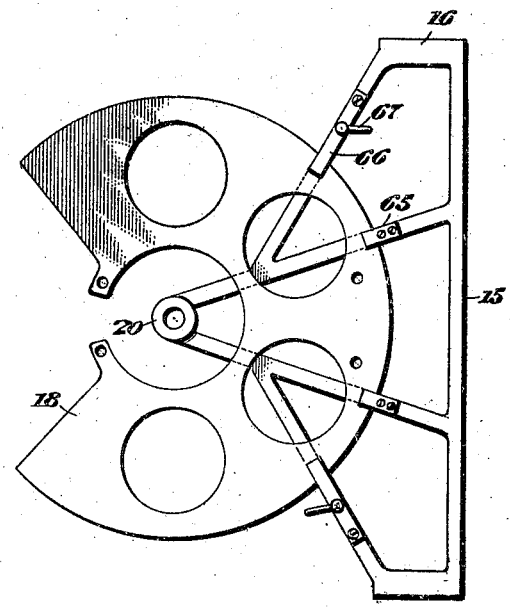

Patented Jan. 2, 1923.

1,441,153

UNITED STATES PATENT OFFICE.

HARRY E. C. JEFFERSON, OF CALUMET, MICHIGAN.

AUTOMATIC SKETCHING AND SURVEYING INSTRUMENT.

Application filed July 27, 1920. Serial No. 399,353.

*To all whom it may concern:*

Be it known that I, HARRY E. C. JEFFERSON, a citizen of the United States, residing at Calumet, in the county of Houghton and State of Michigan, have invented new and useful Improvements in Automatic Sketching and Surveying Instruments, of which the following is a specification.

This invention relates to sketching and surveying instruments, the broad object of the invention being to produce an instrument or machine which will greatly facilitate the work of a survey or in laying or plotting out ground, the instrument being particularly valuable in plotting out irregular tracts and especially those having curvilinear boundary lines. The instrument is also valuable for plotting out mines and the like as will hereinafter appear.

By means of the improved sketching and surveying instrument, a sketch is automatically made on a greatly reduced scale as the assistant moves along the metes and bounds and boundary lines of the plot of ground or the slopes and declivities of a mine, while the surveyor stands immediately adjacent to the instrument and properly sights the same upon the point indicated by the assistant. The size of the sketch may be varied as regulated by correspondingly changing the ratio between the reducing gears of the instrument as will hereinafter appear.

With the above and other objects in view, the invention consists in the construction, combination and arrangement of parts, as herein described, illustrated and claimed.

In the accompanying drawings:

Figure 2 is a vertical longitudinal section through the same;

Figure 4 is a vertical cross section through the machine taken in line with the vertical axis of movement thereof.

Figure 5 is a plan view of the elevated turn table supporting platform, showing the relation of the turn table thereto.

Figure 6 is a vertical sectional view of the same.

Figure 9 is a plan view of the table.

Figure 10 is a fragmentary vertical section showing the table supporting and clamping device.

Figure 11 is a plan view of the table supporting plate.

Figure 1:
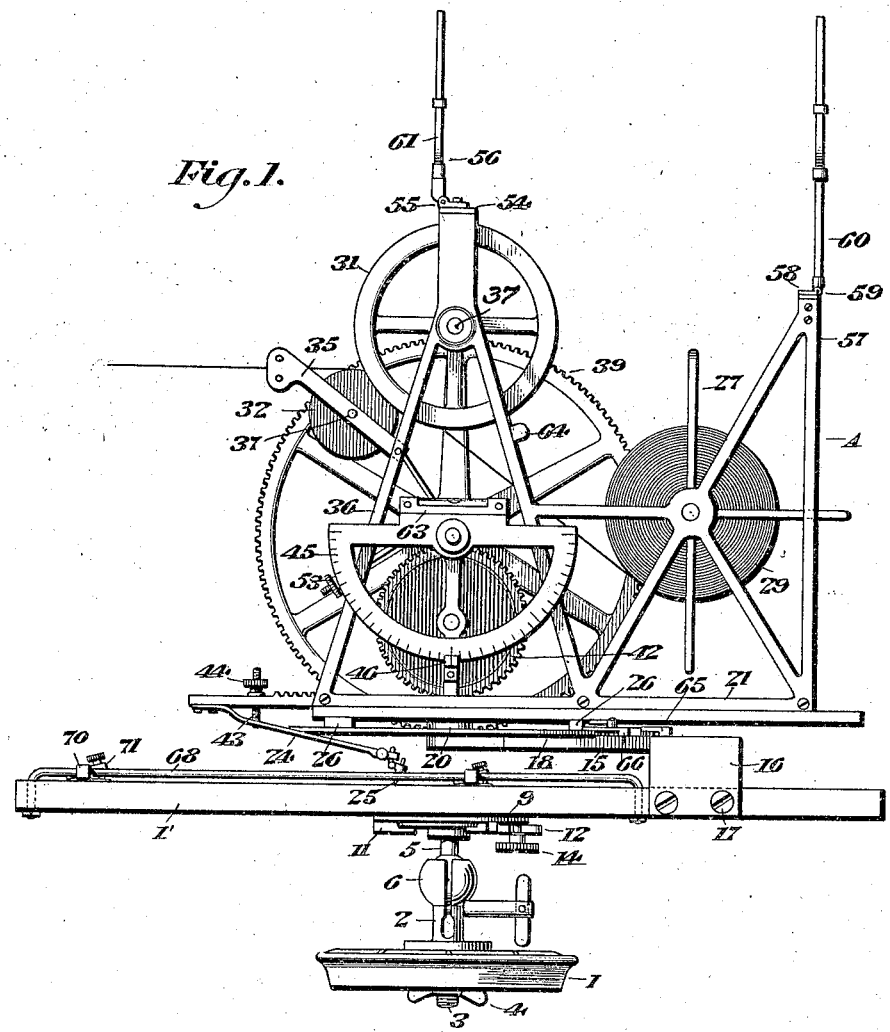
Figure 1 is a side elevation of the improved instrument.

Referring to the drawings, 1 designates a tripod cap or head of ordinary construction, having extending through a central opening therein a table supporting post shown as comprising a lower section 2 having a threaded shank 3 which receives a thumb nut 4 and an upper section 5 having a ball and socket joint at 6 with the lower section 2. The upper section 5 has a disk shaped flange which is connected to a table supporting plate or disk 8 secured to the bottom of a table or leaf at 9 by fastening means 10, the connection between the disc 8 and the table 9 being detachable, the table being for that purpose provided with clips 11 beneath which the flange 8 is slipped, the parts 8 and 9 being firmly secured together by a clamping arm 12 pivotally connected to the member 8 at 13 and having a knob or handle 14. This enables the table 9 to be detached from the table supporting and clamping device illustrated in detail in Figure 10.

Arranged in superimposed and spaced relation to the table or leaf 1' is an elevated turn table supporting platform 15 of skeleton formation as shown in Figure 5, said platform being of generally triangular shape in plan and having supporting feet or risers 16 which embrace the table 1' and are secured thereto by fastening means 17.

Resting upon the platform 15 is a turn table 18 in the form of a multilated disk and extending downwardly from said turn table is a center pin or stud 19 which is journaled for turning movement in a bearing 20 formed in the platform 15. Superimposed above the turn table 18 which is graduated so that the degree of turning movement thereof may be indicated, is a main frame designated generally at A, said frame being of skeleton formation and comprising a base 21 having a central longitudinal slot or guide way 22 in which is mounted a longitudinally movable rack bar 23 carrying a resilient holder 24 for a stylus 25 movable along the surface of a sheet of paper or the like placed upon the table 9, the stylus 25 being controlled by the mechanism hereinafter described for tracing a plot or plan upon such sheet of paper. The base 21 is supported at a suitable elevation above the graduated turn table 18 by spacing blocks 26.

Figure 3:
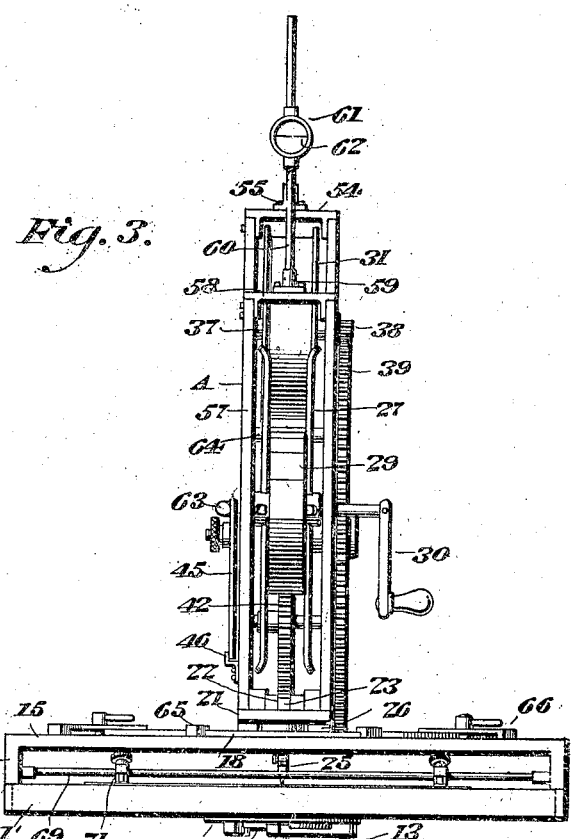
Figure 3 is an end elevation thereof.
Figure 7:
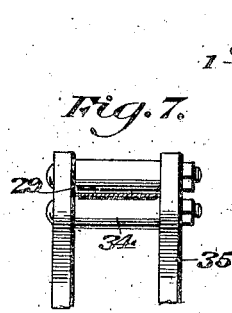
Figure 7 is a fragmentary end view of the tape guiding rollers.
Figure 8:
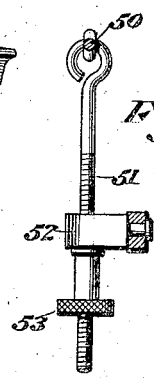
Figure 8 is a fragmentary section showing the tensioning means for the spring of the presser roll.

27 designates a reel or spider-like wheel upon the shaft or spool 28 of which is wound a measuring tape wire, strand or the like 29, the shaft of said reel being journaled in bearings in oppositely disposed portions of the frame A as shown for example in Figures 1 and 3, said shaft being provided on a projecting end thereof with an operating crank 30 enabling said reel to be turned by hand for rewinding the measuring tape thereon.

The tape 29 after leaving the reel 27 extends upwardly at an inclination as shown in Figure 1 and passes between a driving wheel 31 and a presser roll 32. The driving wheel 31 has a resilient tread 33 such as rubber or other good friction material and the roll 32 may have a peripheral tread of corresponding material or said roll 32 may be composed wholly of friction material such as rubber or the like. The object of the resilient treads is to obtain the necessary frictional hold on the measuring tape 29 to insure the rotation of the wheel 31 as the tape is drawn from the reel 27 or as it is running thereon. After passing between the wheel 31 and the roll 32, the measuring tape passes between superimposed tape guide rollers 34 journaled in laterally spaced supporting arms 35 extending upwardly at an inclination from the members 36 of the frame A which support the shaft 37 of the driving wheel 31.

The driving wheel 31 actuates the rack bar 23 and the stylus 25 by the following train of reducing gears. The shaft 37 of the driving wheel 31 has on a projecting end thereof a pinion 38 which meshes with and drives a large gear 39 fast on a short transverse shaft 40 journaled in the frame A and having at its inner end a pinion 41 which meshes with a large gear 42, the latter meshing with the rack bar 23. By changing the relative sizes of the reducing gears or by changing the size of the driving wheel 31, the ratio of movement between the periphery of the driving wheel 31 and the rack bar 23 may be changed as found desirable by the operator.

The arm 24 which carries the stylus 25, the latter being either in the form of a pen, pencil, or the like, is of spring material and greater or less tension may be brought to bear on the stylus by means of a tensioning member 43 shown in the form of a screw passing through the projecting end of the rack bar 23 and adjustable by means of a knurled wheel 44 or the equivalent thereof. Secured to one side of the frame A is a graduated inclinometer segment 45 which in connection with a suitable pointer or guide 46 is used to indicate the inclination of the base 21 and the table 1'.

The arms 35 between which the presser roll 32 is journaled are connected pivotally at 47 to the frame members 36 and are carried by the free extremity of a spring arm 50. The tension of the arm 50 may be increased or diminished by means of a spring tensioning screw 51 passing through a guide 52 on the frame and adjustable by means of a milled nut 53, thus any desired tension may be placed on the roll 32 to urge the same with the necessary pressure against the measuring tape 29 and the tread of the driving wheel 31. The upstanding side portions of the members 36 of the frame A are connected by a top cross bar 54 to which is connected by a hinge 55 a normally vertical sight 56 shown in the form of a rod or stem. Other upstanding portions 57 of the frame A are connected in like manner by a like cross bar 58 to which is connected by a hinge 59 another vertical sight 60 also shown in the form of an upstanding rod or stem. The front and rear vertical sights are thus provided to enable the table and base of the frame to be adjusted to a horizontal position if required. Each of the vertical sights 56 and 60 is formed intermediate the ends thereof with a ring like or circular portion 61 across which extends a normally horizontal or leveling sight 62 in the form of a wire or strand of any kind. In addition to the sights just referred to, for the purpose of noting relative elevations, leveling bubble holders 63 and 64 are provided to facilitate the work of the party adjusting the instrument either for laying out plots on level ground surfaces or plots for plotting mines when the instrument is turned upon one side.

In connection with the turn table 18, I employ guides 65 secured to the platform 15 and I also employ one or more combined clamps and guides 66 which are moved to clamping position against the upper surface of the turn table 18 by clamping members or screws 67 having a threaded engagement with the platform 15.

The table 1 has on the upper side thereof parallel rods 68 arranged adjacent to the opposite longitudinal margins of said table and having a fixed but spaced relation to the upper surface thereof. Other rods 69 extend perpendicular to the rods 68 but are slidably connected to the latter by runners 70, enabling the rods 69 to be moved toward and away from each other. Paper holding clamps 71 are mounted upon and movable lengthwise of the rods 69 for the purpose of clamping sheets of paper of different sizes against the upper surfaces of the table, each of the clamps 71 comprising a clamping screw 72 or the equivalent thereof. The table has on the upper surface thereof designating lines 73 and 74 crossing each other centrally of the table and extending perpendicularly to each other, the table being preferably so positioned with respect to the points of the compass that the line 73 will extend from north to south as indicated by the letters "N" and "S" while the line 74 will extend from east to west as indicated by the letters "E" and "W". The table may, of course, be positioned according to the desire of the surveyor, after the desired station for the instrument has been selected.

Known stations or points are usually plotted on the sketch sheet clamped on the upper surface of the table and I preferably use a sheet which is oriented, shifting the sheet while the co-ordinate lines passing through the station, as plotted, coincide both ways with the right angular orienting lines "N", "S", "E" and "W" marked on the table. With the instrument properly set up, at the selected station, as with an ordinary transit, oriented paper is placed upon a table and clamped in the manner set forth. The table is then oriented depending upon where the sketching is to be done, this being accomplished by establishing a temporary point "N", "S", "E" or "W" at the discretion of the engineer. The turn table is then released so that it may turn freely. The assistant now grasps the end of the tape or the ring at the end of the tape, and pulls the measuring tape out to the point where the sketching is to be started, he then follows the desired course to be sketched, holding the tape extremity free so that it may be seen by the man at the instrument. If greater accuracy is required a plumb bob may be used by the assistant, the height of the free end of the tape being determined by the leveling sights of the instrument. If sketching is to be done on a long slope, the table of the instrument is pitched or inclined so as to lie in a plane parallel to the slope, the vertical angle being noted.

The man at the instrument stands back of the latter with his right hand on the reel operating crank handle and his left hand on the rear end of the base 21. He swings the instrument with his left hand with the aid of the vertical sights, keeping them sighted on the free end of the measuring tape held by the assistant. Wherever the assistant goes, the man at the instrument keeps the sights upon him. When the assistant has covered the course, the sketching is finished, the instrument having automatically covered and marked or traced out the same course and plotted it on a greatly reduced scale. There is a great advantage in not having to write down any notes at the time thereby incurring the chances of making personal errors.

For laying out curves, regular or irregular, and the like, the improved instrument hereinabove described will be found of great assistance, the operation simply being the reverse of the automatic sketching hereinabove described. For example, the engineer may lay out on the sketching sheet any desired curve or outline, then go into the field and lay it out as sketched, without any computing whatever, but by simply reversing the sketching operation hereinabove described.

For plotting and sketching mines, tonnage, and the like, the instrument hereinabove described will be found of great value, producing practical means for obtaining an accurate outline of a mine stope and data for determining tonnage mined or to be mined. This instrument will give more accurate results than a transit as it reproduces every point along the back or breast of stope, while with a transit, only the most prominent changes will be noted. The instrument is used in the mine just as on the surface of the ground. The table is pitched or tilted so that it is in a plane parallel to the foot, the assistant holds a light at the free end of the measuring tape to enable the man at the instrument to easily follow his movements. The sketching sheet having been oriented with the stope base line, the use of a protractor is unnecessary in plotting the stope, as distances are readily taken from the sketch. The stope sketching being continuous, month after month, showing on the respective sketch, which should be dated, a planimeter is used for determining the area of the stope mined each month. The average width of vein having been determined and the area known, the tonnage may be quickly computed. The average width and date are shown and noted when the sketch is made and the area and tonnage are completed at the office, subsequently. By exercising a little thought, the instrument may be used in a great many ways and to accomplish various results.

I claim:—

1. In a sketching and surveying instrument, the combination of a support, a table having a universal mounting upon said support, means for clamping said table in fixed relation to said support, a normally horizontal turn table adapted to turn on a normally vertical axis, a frame superimposed above said table and comprising a normally horizontal base, a stylus carrying member slidable in relation to said base and movable over the surface of said table, a reel, a measuring tape wound on said reel, guiding means for said tape, and stylus actuating means including a driving wheel geared to said stylus driving means, and actuated by said measuring tape.

2. In a sketching and surveying instrument, the combination of a support, a table having a universal mounting upon said support, means for clamping said table in fixed relation to said support, a normally horizontal turn table adapted to turn on a normally vertical axis, a frame superimposed above said table and comprising a normally horizontal base, a stylus carrying member slidable in relation to said base and movable over the surface of said table, a reel, a measuring tape wound on said reel, guiding means for said tape, and stylus actuating means including a driving wheel geared to said stylus driving means and actuated by said measuring tape, in both the reeling and unreeling movements of the latter.

3. In a sketching and surveying instrument, the combination of a support, a table having a universal mounting upon said support, means for clamping said table in fixed relation to said support, a normally horizontal turn table adapted to turn on a normally vertical axis, a frame superimposed above said table and comprising a normally horizontal base, a stylus carrying member slidable in relation to said base and movable over the surface of said table, a reel, a measuring tape wound on said reel, guiding means for said tape, stylus actuating means including a driving wheel geared to said stylus driving means and actuated by said measuring tape, and hinged vertical sights connected with said frame and arranged in spaced relation with each other.

4. In a sketching and surveying instrument, the combination of a support, a table having a universal mounting upon said support, means for clamping said table in fixed relation to said support, a normally horizontal turn table spaced above the first mentioned table and adapted to turn on a normally vertical axis, a frame superimposed above said turntable and comprising a normally horizontal base, a stylus carrying member between the tables and slidable in relation to said base, and movable over the surface of the first mentioned table, a reel, a measuring tape wound on said reel, guiding means for said tape and stylus actuating means including a driving wheel geared to said stylus driving means and actuated by said measuring tape.

5. In a sketching and surveying instrument, the combination of a support, a table having a universal mounting upon said support, means for clamping said table in fixed relation to said support, a normally horizontal turn table adapted to turn on a normally vertical axis, a frame superimposed above said table and comprising a normally horizontal base, a stylus carrying member slidable in relation to said base and movable over the surface of said table, a reel, a measuring tape wound on said reel, guiding means for said tape, stylus actuating means including a driving wheel geared to said stylus driving means and actuated by said measuring tape, and vertical sights connected with said frame and arranged in spaced relation with each other, said sights being hinged and foldable.

6. In a sketching and surveying instrument, the combination of a support, a table having a universal mounting upon said support, means for clamping said table in fixed relation to said support, a normally horizontal turn table adapted to turn on a normally vertical axis, a frame superimposed above said table and comprising a normally horizontal base, a stylus carrying member slidable in relation to said base and movable over the surface of said table, a reel, a measuring tape wound on said reel, guiding means for said tape, and stylus actuating means including a driving wheel geared to said stylus driving means and actuated by said measuring tape, the gearing between said driving wheel and stylus actuating member being of the reduction type.

7. In a sketching and surveying instrument, the combination of a support, a table having a universal mounting upon said support, means for clamping said table in fixed relation to said support, a normally horizontal turn table adapted to turn on a normally vertical axis, a frame superimposed above said table and comprising a normally horizontal base, a stylus carrying member slidable in relation to said base and movable over the surface of said table, a reel, a measuring tape wound on said reel, guiding means for said tape, stylus actuating means including a driving wheel geared to said stylus driving means and actuated by said measuring tape, a presser wheel for holding said measuring tape against the periphery of the driving wheel, means for varying the pressure of said presser wheel in relation to the driving wheel, movable means by which said presser roll is carried, and tape guiding rollers carried by said movable means.

8. In a sketching and surveying instrument, the combination of a table adapted to support a sketching sheet, a turn table mounted in elevated and spaced relation to said table, a stylus, a stylus carrying member slidable in relation to said turn table, a frame supported by said turn table, a measuring tape, a reel upon which said tape is wound, reel actuating means, a tape actuated driving wheel, gearing between said driving wheel and said stylus carrying member, spaced parallel guide bars carried by the sheet supporting table, right angularly disposed adjustable guide bars carried by the first mentioned bars and clamping devices adjustably mounted upon the adjustable guide bars.

In testimony whereof I affix my signature.

HARRY E. C. JEFFERSON.